United States Patent [19]

Vogele

[11] Patent Number: 4,873,600
[45] Date of Patent: Oct. 10, 1989

[54] UTILITY PEDESTAL

[75] Inventor: Thomas A. Vogele, Newport Beach, Calif.

[73] Assignee: Unicorn Electrical Products, Anaheim, Calif.

[21] Appl. No.: 104,106

[22] Filed: Oct. 5, 1987

[51] Int. Cl.$^4$ ............................................. H01R 9/00
[52] U.S. Cl. ..................................... 361/426; 174/50; 174/52.1; 361/357; 361/364
[58] Field of Search ................... 174/39, 48, 50, 52 R; 312/100; 361/334, 364, 356; 379/326, 327, 329, 330, 387, 397, 437, 438

[56] References Cited

U.S. PATENT DOCUMENTS

| Re. 31,359 | 8/1983 | Nickola | 361/364 |
|---|---|---|---|
| 2,779,812 | 1/1959 | Rowe | 174/50 |
| 3,891,899 | 6/1975 | Sparling | 361/334 |
| 3,895,179 | 7/1975 | Wyatt | 174/50 |
| 4,015,397 | 4/1977 | Flachbarth et al. | 174/48 |
| 4,246,436 | 1/1981 | Hoffman et al. | 174/50 |
| 4,307,436 | 12/1981 | Eckart et al. | 361/357 |

Primary Examiner—A. D. Pellinen
Assistant Examiner—Gregoroy D. Thompson
Attorney, Agent, or Firm—Knobbe, Martens, Olson & Bear

[57] ABSTRACT

A utility station or pedestal for a boat dock is formed of an upper portion hinged to a lower portion. The interface between the portions extends across the housing at an angle with respect to horizontal so that when the upper portion is swung into an open position, an electrical terminal block mounted in the lower portion is readily accessible for connecting power lines introduced through the bottom of the housing.

9 Claims, 2 Drawing Sheets

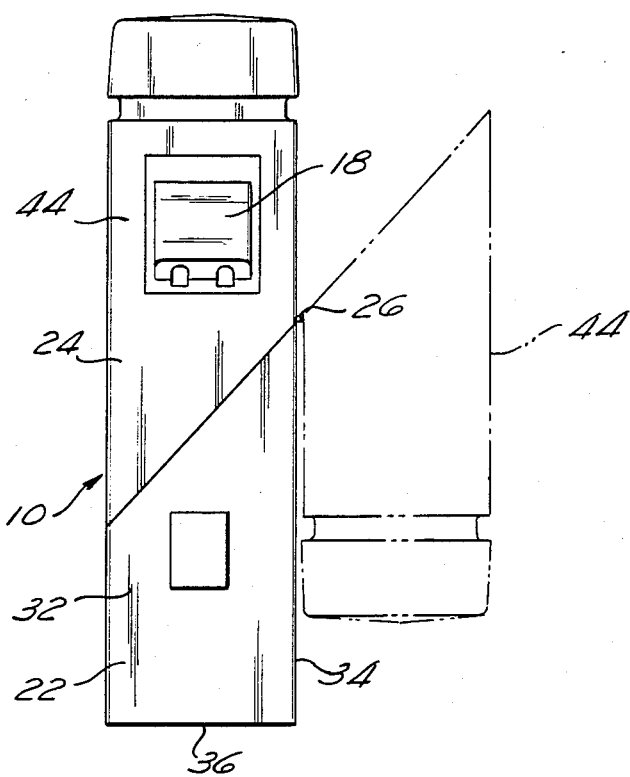
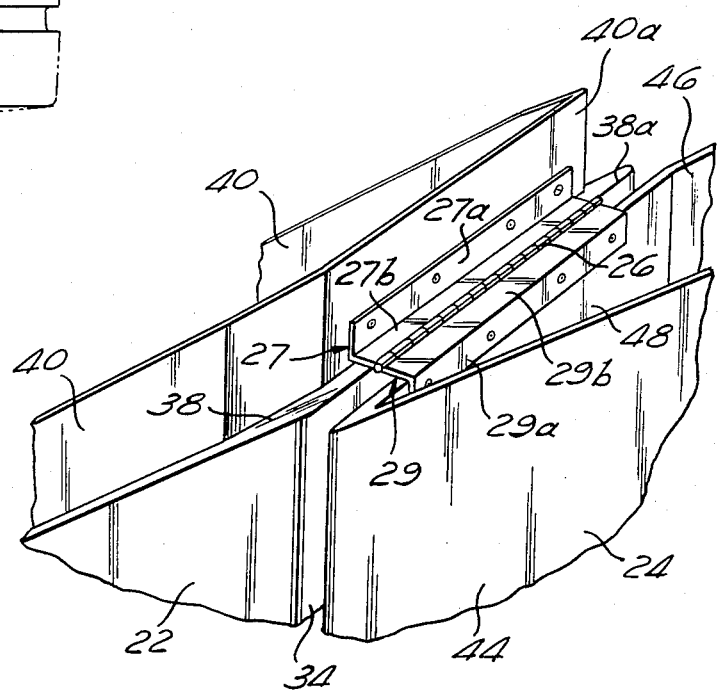
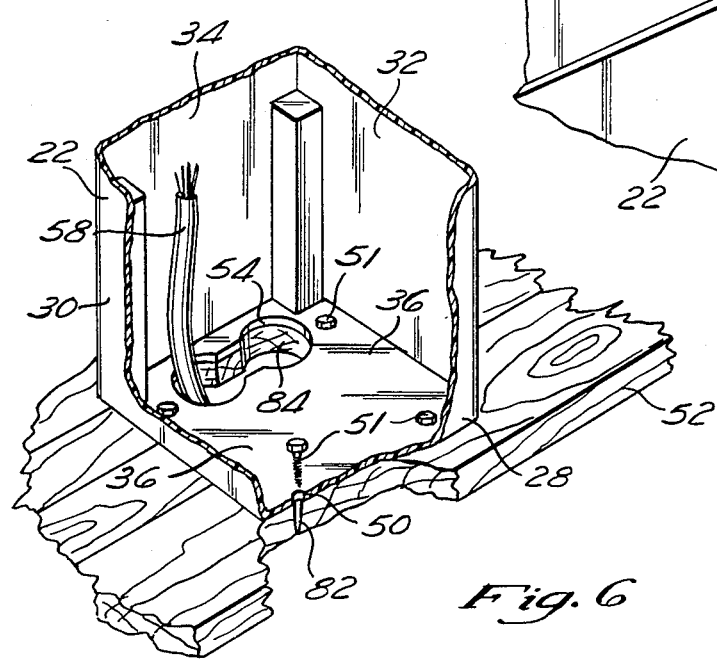

UTILITY PEDESTAL

FIELD OF THE INVENTION

This invention relates to the distribution of electrical power and other utilities at a station or pedestal of a type that is particularly useful on docks for boats.

BACKGROUND OF THE INVENTION

Users of boats anchored to docking facilities desire convenient access to electrical power and other utilities such as water, telephone and, increasingly, television cable connections. The providing of these services has developed over the years to a point where the connections for these services have been conveniently combined into a single station or pedestal. The installation of such a station usually involves marking the location on the dock on which the facility is to be mounted, drilling holes and other connections in the dock, and positioning the station housing on the dock. It is then necessary to introduce the various utilities to the station housing and make the necessary connections to couplings, power terminal blocks and other such outlets in the housing.

One of the more time-consuming steps of this operation is the connection of the incoming electrical lines. In one common approach, the electrical lines are introduced through the bottom of the housing and then are connected to power blocks and ground terminals located within the housing about midway between the top and bottom of the housing. To make the connections, it is therefore necessary to have access to this central area in the housing.

In one known station, an access hole or window is formed in one wall of the housing. With a rectangular housing, this has meant that it has been necessary for the installer of the cable to reach through the opening between the two adjacent side walls to reach the terminals on the back wall. Also, it is necessary to reach through the opening and downwardly to the bottom of the housing to pull the electrical lines upwardly towards the midsection of the housing. The space is relatively restricted from side to side by the side walls. Also, the vertical height of the window is typically rather limited such that the upper and lower edges of the window also interfere with the convenience of the operation. U.S. Pat. No. 4,307,436 shows one example of such an arrangement.

In another system utilized, the housing is formed with corner supports and four separate panel-type side walls; and during installation the housing is sufficiently disassembled to enable one complete wall to be removed from the housing. While this increases access in the vertical direction, it does not appreciably change the side-to-side accessibility, since the side walls are still in position. More importantly, the strength and integrity of the housing is seriously weakened when a wall is completely removed, so that care must be taken in handling the remainder of the housing. Also, the disassembly and assembly steps are increased with this technique, and the number of parts or fasteners to be removed is increased. This further increases the risk of components being misplaced or, worse yet, falling off the edge of the dock and into the water.

In yet another system, the housing includes an internal base to which the electrical lines are connected. An outer shell surrounds the base and is positioned in place after the electrical lines have been connected to the base. This approach has the advantage of providing excellent access while the lines are being connected; but it has the serious disadvantage that the wiring from the terminal blocks to the electrical outlets in the walls of the housing must then be connected to the terminal blocks. Pre-wiring of the connections from the terminal blocks to the electrical outlet is not practical, unless inordinately long electrical connections are provided; and this in turn introduces an undesirable amount of wire to be stuffed into the housing when the two components are being assembled. Also, time is required to position and assemble the outer shell to the base.

All of the various systems used take a considerable amount of time which, in turn, adds significant expense because of the high labor rates for the electricians required to perform the installation.

In view of the foregoing, it can be appreciated that a need exists for an improved system for installing electric and other utilities to a utility station or pedestal at a boat dock or similar installation.

SUMMARY OF THE INVENTION

Briefly stated, a utility station or pedestal housing is formed with separate upper and lower portions movably connected, such as by hinging, to enable the entire upper portion to be swung away from the lower portion. The interior of the lower portion is then accessible through its open upper end. Electric terminal blocks are positioned in the lower housing so that the electrical lines may be conveniently and quickly connected to the terminal blocks. Further, the connection between the upper and lower portions is arranged to enable the connections between the terminal blocks and the electrical outlets to be pre-wired so as to further minimize the installation time.

In a preferred form of the invention, the interface across the housing between the upper and lower portions is formed at an angle, with respect to horizontal, with the high side of the lower portion being the back wall and the low side being the front wall. The power terminals are located on the back wall of the lower portion close to the upper edge of that back wall. With this arrangement, the power terminals are fully accessible in the direction towards the front wall as well as the side walls. Thus, the electrical connections to the power block can be quickly made. Also, the hinge joining the upper and lower portions is in the back wall and arranged so that the upper portion opens upwardly and rearwardly in a manner such that the pre-wired connections between the power block are not adversely affected by opening and closing movement of the housing. The lower edge of the upper housing portion fits over the upper edge of the lower housing portion to prevent water from entering the housing. Preferably, the upper edge of the lower portion is recessed inwardly to fit within the lower edge of the upper portion.

In accordance with the method of the invention, the utility station for a dock is installed by drilling holes through the dock for receiving electrical power lines and drilling holes in the dock for mounting a housing on the dock. The lower portion of the utility station housing is then positioned over the mounting holes and secured to the dock by suitable fasteners extending through holes in the bottom wall of the housing and into the mounting holes in the dock. The upper portion of the housing which is movably connected to the lower portion such as by hinging, has been moved to an open position while the lower portion is being mounted to the dock. Power lines are then introduced to the lower portion of the housing by being inserted through the holes in the dock, and these power lines are conveniently connected to a terminal block located on the back wall of the lower portion of the housing. The upper portion of the housing is then swung to a closed position on the lower portion about the hinge connecting the portions. The upper portion is latched in this closed position by suitable means.

BRIEF DESCRIPTION OF THE DRAWINGS

FIG. 4 is a side elevational view of the utility station illustrating the angled two piece construction of the utility station with the upper portion shown in phantom lines in the open, position.

FIG. 5 is an enlarged, fragmentary, perspective view of the hinged construction of the utility station.

FIG. 6 is a fragmentary, perspective, partially sectionalized view of the bottom of the utility station and its connection to a boat dock.

DETAILED DESCRIPTION OF A PREFERRED EMBODIMENT

Figure 1:
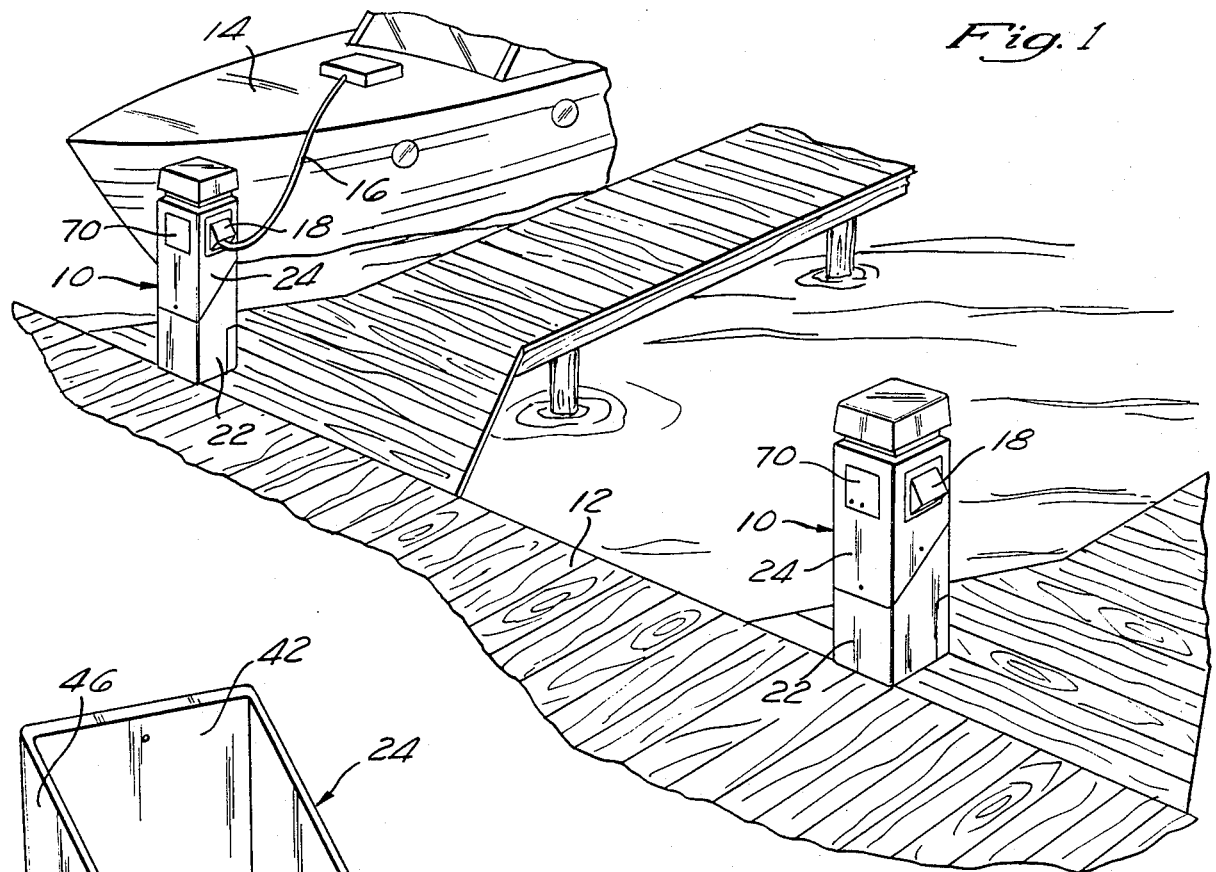
FIG. 1 is a perspective view schematically illustrating the utility station of the invention positioned on a boat dock.

FIG. 1 illustrates a pair of utility stations 10 mounted on a dock 12. A portion of a boat 14 is schematically illustrated adjacent to the dock with an electric utility line 16 extending from an electrical outlet 18 on the utility station on to the boat.

The primary component of the utility station 10 is a hollow, generally rectangular housing 20, preferably molded of super-strength, cross-linked polyethylene of a thickness to provide the needed strength and rigidity. The polyethylene material is highly desirable for this purpose in that it is strong enough to withstand the abuse to which it is likely to be subjected and to withstand the harsh marine environment. It requires virtually no maintenance.

Figure 2:
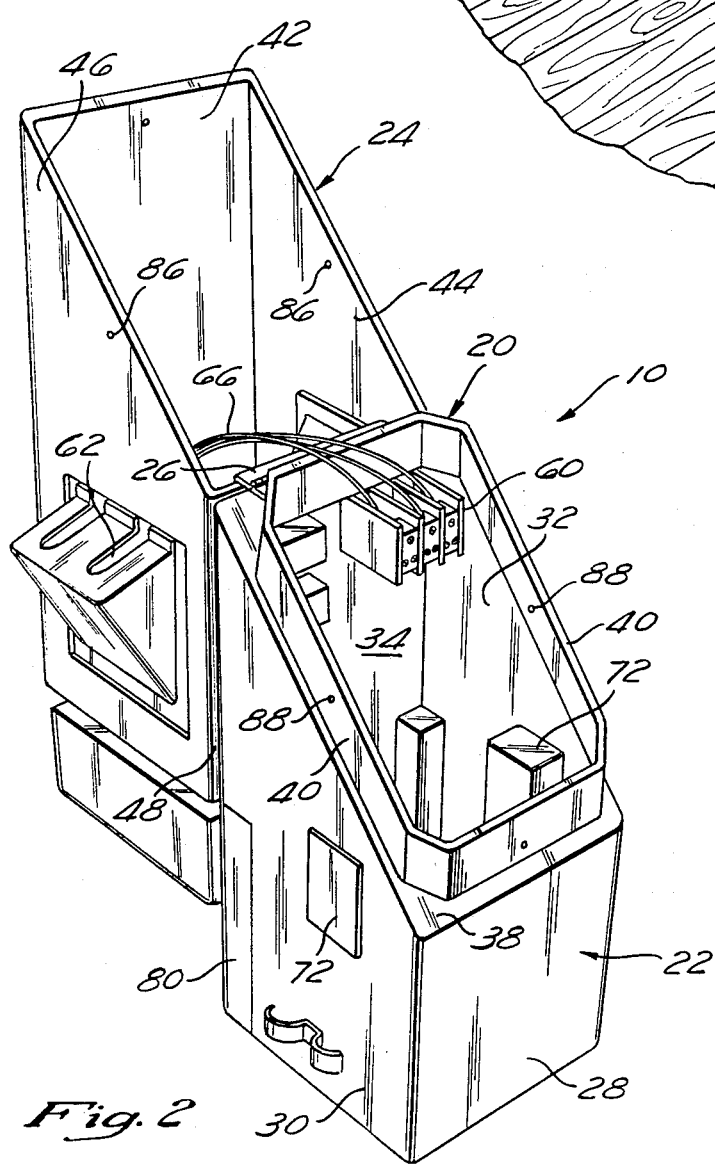
FIG. 2 is a perspective view of the utility station of the invention in its open position.
Figure 3:
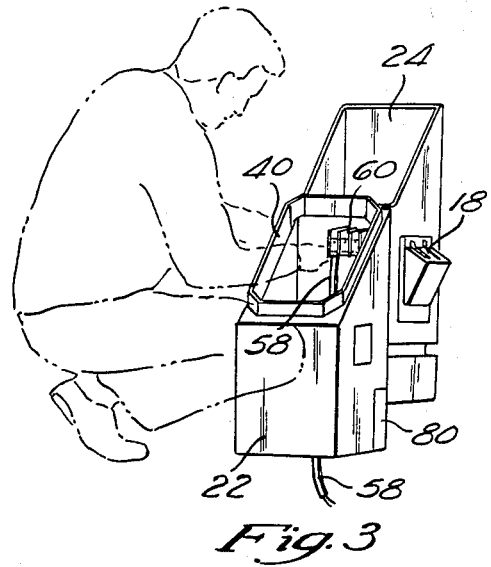
FIG. 3 is a perspective view of the utility station in an open position schematically illustrating a workman making electrical connections.

In accordance with the invention, the housing 20 is formed of a lower portion 22 and an upper portion 24 which are joined by a hinge 26, with the interface between the housing portions being obliquely angled. Such construction permits the upper portion 24 to be swung around the hinge from a closed position as shown in FIGS. 1 and 4 to an open position as shown in FIGS. 2 and 3, and as further shown in phantom lines in FIG. 4. The interior of the lower portion is thereby readily accessible.

The housing lower portion 22 includes a front wall 28, side walls 30 and 32, a rear wall 34, and a bottom wall 36, as shown in FIG. 6. The upper end of the bottom portion 22 is open, and it is angled with respect to horizontal or vertical, preferably about 45 degrees, as best seen from FIG. 4. The upper edge slopes from a horizontal edge or high side on the back wall downwardly to a horizontal edge or low side on the front wall 28. The upper edges of the side walls 30 and 32 therefore slope between the front and back walls at the preferred 45 degree angle.

The upper end of the housing lower portion 22 is formed to fit within the lower end of the housing upper portion 24. In the form of the invention illustrated, this is accomplished by providing an inwardly extending flange 38 around the periphery of the upper edge of the housing side walls. Upperwardly extending stub walls 40 are formed on the inner edges of the flange 38 such that the stub walls 40 form an approximately rectangular projection which fits within the lower end of the upper portion 24. The corners of this projection are angled to facilitate the molding process and to provide clearance for the upper housing portion 24. The flange and stub wall construction also provides needed rigidity and strength to the open upper end of the lower housing.

The upper housing portion has the same shape as the lower portion and the same exterior dimensions so that the exterior walls are flush with each other in the closed position as shown in FIGS. 1 and 4. The upper portion includes a front wall 42, side walls 44 and 46 and a rear wall 48. Consistent with the angled interface between the housing portions, the open angled lower end of the upper portion, when in closed position, extends from a horizontal lower edge of the short rear wall 48 to a horizontal lower edge of the longer front wall 42, with the lower edges of the side walls 44 and 46 extending between the front and back walls at the preferred 45 degree angle. When in the closed position, the lower edge of the open upper portion 24 rests on the flange 38 of the upper end of the lower portion, with the lower end of the upper portion surrounding the stub walls 40 on the lower housing portion 22.

Referring to FIG. 5, the hinge 26 is of the offset angled variety including a first angled element 27 having a segment 27a attached to the exterior of the rear wall portion 40a of the stub walls 40. A second segment 27b of the first angled element 27 engages the rear wall portion 38a of the flange 38. A second angled element 29 includes a segment 29a secured to the inside of the lower edge of the rear wall 48 of the upper housing portion 24. A second segment 29b extends across the open edge of the rear wall 48, where it is hinged to the horizontal segment 27b of the element 27. Such a hinge connection provides the necessary strength while allowing the offset movement that permits the upper housing portion 24 to move between its open position wherein its open end extends upwardly as shown in FIG. 2 to its closed position where the open end extends downwardly as shown in FIG. 4.

Referring to FIG. 6, the bottom wall 36 of the housing lower portion 22 is formed with a plurality of mounting holes 50 for receiving fasteners 51 to secure the housing portion to the underlying dock member 52. The bottom wall 36 further includes an opening 54 through which one or more electrical lines or cables 58 extend.

An electrical terminal block or assembly 60 is mounted to the upper portion of rear wall 34 of the lower housing portion, as seen in FIGS. 2 and 3. Electrical connections from that terminal block to the electrical outlets 62 and 18 are pre wired by wires 66. Also, all other electrical connections from the terminal block (not shown) are pre-wired before the station is installed so that it is only necessary to connect the incoming power lines to the terminal block at the time of installing the utility station. Some of these other electrical connections include wires (not shown), extending between electrical switches schematically illustrated at 70 in FIG. 1, t.v. outlets schematically indicated at 72 in FIG. 2, and telephone outlets schematically illustrated at 76 in FIGS. 2 and 3. Also, water connections are supplied behind the panels 80 shown adjacent the rear corners of the housing lower portion 22.

As a normal first step in installing the station 10, holes 82 are drilled in the dock member 52 shown in FIG. 6 aligned with the holes 50 in the bottom housing wall 36. Also holes 84 are formed in the dock member for receiving the incoming electrical lines 58. A suitable template of the bottom wall 36 may be employed for properly positioning the holes in the dock member. Alternatively, the bottom wall 36 of the housing can be directly used by positioning the housing as desired, opening the housing to the position shown in FIG. 2, and drilling the holes in the dock member through the pre-formed holes 50 and 54 in the bottom wall 36. If a template is employed, the next step is to position the housing lower portion 22 aligned over the holes in the dock. The housing is then secured in position by lag bolts 51 or other suitable fasteners extending through the holes 50 and into the dock member 52. This installation step can be conveniently made by a workman by extending his hands downwardly into the lower portion of the housing, since its open upper end is readily accessible.

As a next step, the electrical lines 58 are introduced from below the dock upwardly through the hole 84 in the dock member 52 and the hole 54 in the bottom wall 36. These lines are connected to the terminal block 60. The connection operation is greatly simplified since the terminal block and the end of the incoming electrical lines are readily accessible to the workman because of the hinged, angled housing construction. The convenience of this operation is schematically illustrated in FIG. 3. Note from FIG. 2 that the pre-wired connections are not disturbed with the housing in its open position. Thus, after the necessary connections have been made with respect to the incoming lines, installation is basically complete; and the upper housing portion 24 may be swung to its closed position. To maintain it in that closed position, fasteners may be installed through small holes 86 in the lower end of the upper portion and received in aligned holes 88 in the stub walls 40 of the lower housing portion 22.

In addition to the simplified installation procedure, it should be noted that the installed station is very sturdy because of the interconnection between the housing portions. Also, this connection is arranged so that water from rain or from hoses on the dock cannot enter the interior of the housing and engage the electrical connections. Further, with the terminal block 60 positioned near the top of the lower portion, it is adequately high to be sufficiently safe with respect to water that might splash onto the dock during storms.

While the hinged construction is preferred, other arrangements may be employed wherein the upper portion is movably connected to the lower portion in an open position, while the station is pre-wired.

What is claimed is:

1. A utility station for mounting on a dock, comprising a generally vertically extending housing formed by a lower portion having an open upper end and an upper portion having an open lower end, said ends having edges which mate with each other to form an interface between said portions, said interface extending across said housing at an angle with respect to horizontal and creating a high side and a low side on the upper edge of said lower portion, structure for movably connecting said portions to permit said upper portion to be moved with respect to said lower portion from a closed position wherein the upper portion is vertically aligned on the lower portion and an open position wherein the upper portion is moved away from said lower portion to provide access to the upper end of the lower portion, an electric terminal block mounted on a wall of said lower portion near said upper end, said terminal block being connected to the high side of said lower portion, and said angle being such that the terminal block is above said low side, thus being readily accessible in a horizontal direction when said upper portion is in its open position, thereby enabling powerlines to be conveniently connected to said terminal block, an electrical outlet on said upper portion, and electrical wiring connecting said outlet to said terminal block, said wiring being sufficiently long not to restrict movement of said upper housing portion between said closed and opened positions.

2. The utility station of claim 1 wherein said connecting structure comprises a hinge joining said portions to permit the lower end of said upper portion to be swung away from the upper end of said lower portion.

3. The utility station of claim 2 wherein said hinge is constructed to permit said upper portion to be swung through an arc wherein the open end of said upper portion is facing upwardly.

4. The utility station of claim 1 wherein said connecting structure includes a hinged joined to the high side of said lower portion and an adjacent side of said upper portion.

5. The utility station of claim 1 wherein said interface is formed so that water striking the sides of said housing when in the closed position will not leak into the housing.

6. The utility station of claim 1 wherein the upper end of said lower portion has an inwardly extending flange which abuts the lower end of said upper portion and an upwardly extending member that fits within the lower end of said upper portion.

7. The utility station of claim 1 wherein said angle extends at approximately 45 degrees with respect to horizontal.

8. A utility station for mounting on a dock, comprising a generally vertically extending housing formed by a lower portion having an open and upper end and an upper portion having an open lower end, said ends having edges which mate with each other to form a separable interface between said portions to permit said upper portion to be moved with respect to said lower portion from a closed position wherein the upper portion is vertically aligned on the lower portion and an open position wherein the upper portion is moved to provide access to the upper end of the lower portion, an electric terminal block mounted on a wall of said lower portion near said upper end so that the terminal block is conveniently accessible through said open upper end when said upper portion is in its open position, thereby enabling power lines to be conveniently connected to said terminal block, said interface extending across said housing at an angle with respect to horizontal and creating a high side and a low side on the upper end of said lower portion, said terminal block being mounted to the high side of said lower portion, and said angle being such that the terminal block is readily accessible in a horizontal direction, an electrical outlet on said upper housing portion, and electrical wiring sufficiently long not too restrict relative movement between the housing upper and lower portions connecting said outlet to said terminal block.

9. A utility station for mounting on a boat dock and providing utilities, including electric power, to boats, said utility station affording ease of installation, providing structural rigidity during installation, and providing resistance to harmful introduction of moisture to its interior, comprising:

a. a housing lower portion having:
 (i) means for mounting said housing lower portion to a dock;
 (ii) a bottom wall;
 (iii) a front wall extending upwardly from said bottom wall;
 (iv) a rear wall extending upwardly from said bottom wall;
 (v) side walls extending upwardly from said bottom wall and interposed between said front and rear walls;
 (vi) means for introducing utilities, including wires carrying electric power, through said housing lower portion to the interior thereof;
 (vii) an electric terminal block mounted near the top of the interior of said rear wall for receiving wires carrying electric power, wherein said rear wall extends higher than said front wall so that said terminal block is above the top of said front wall so that said terminal block readily accessible in a horizontal direction to afford easy attachment of the electric power wires to said terminal block;
 (viii) stub walls inwardly offset from and upwardly extending from said lower housing portion front, rear and side walls;

b. A housing upper portion having:
 (i) a top surface;
 (ii) a front wall extending downwardly from said top surface;
 (iii) a rear wall extending downwardly from said top surface;
 (iv) side walls extending downwardly from said top surface interposed between said front and rear walls, wherein said front wall extends lower than said rear wall so that said upper housing portion front, rear and side walls mate with each in an abutting relation, said upper housing portion is vertically aligned with said lower housing portion, and said lower housing portion stub walls extend into the interior of said upper housing portion, thereby providing structural rigidity and resistance to introduction of moisture; and
 (v) an electrical outlet for receiving an electric utility line from a boat for supplying electrical power thereto;

c. structure for movably connecting said lower and upper housing portions to permit said upper housing portion to be moved out of vertical alignment with said lower housing portion to provide access to the terminal block; and d. electrical wiring between said terminal block and said electrical outlet of sufficient length to allow said upper housing portion to be moved out of vertical alignment with said lower housing portion so as to maintain electrical connection between said terminal block and said electrical outlet while providing access to the terminal block.

* * * * *